United States Patent [19]

Wolfe et al.

[11] Patent Number: 5,532,574
[45] Date of Patent: Jul. 2, 1996

[54] BRUSHLESS EXCITER PROTECTION CIRCUIT

[75] Inventors: William R. Wolfe, Penn Hills; Raymond M. Calfo, Murrysville, both of Pa.

[73] Assignee: Westinghouse Electric Corporation, Pittsburgh, Pa.

[21] Appl. No.: 219,125

[22] Filed: Mar. 28, 1994

[51] Int. Cl.$^6$ .............................. H02H 1/00; H02H 7/06
[52] U.S. Cl. .............................................. 322/37; 361/21
[58] Field of Search .......................... 322/25, 28; 290/99, 290/37, 31, 40 R

[56] References Cited

U.S. PATENT DOCUMENTS

| | | | |
|---|---|---|---|
| 3,534,228 | 10/1970 | Hyvarinen et al. | 317/13 |
| 3,702,965 | 11/1972 | Drexler et al. | 322/25 |
| 3,705,331 | 12/1972 | South et al. | 317/13 R |
| 3,733,518 | 5/1973 | Polulyakh et al. | 317/13 |
| 4,103,217 | 7/1978 | Avinger et al. | 322/28 |
| 4,106,069 | 8/1978 | Trautner et al. | 361/30 |
| 4,164,705 | 8/1979 | Whitney et al. | 324/158 |
| 4,486,801 | 12/1984 | Jackovich et al. | 361/21 |
| 4,492,999 | 1/1985 | Amagasa | 361/21 |
| 4,528,493 | 7/1985 | Spencer et al. | 322/99 |
| 4,559,486 | 12/1985 | Spencer et al. | 322/99 |
| 4,595,965 | 6/1986 | Glennon | 361/20 |
| 4,613,808 | 9/1986 | Edwards | 322/99 |
| 5,093,597 | 3/1992 | Hughes | 310/209 |

*Primary Examiner*—Steven L. Stephan
*Assistant Examiner*—Nicholas Ponomarenko
*Attorney, Agent, or Firm*—J. C. Spadacene

[57] ABSTRACT

A protection circuit for a brushless excitation system is provided which directly monitors the output voltage of the diode bridge rectifier of the system. The protection circuit includes a reference signal generator subcircuit which provides a reference signal which tracks the dc output voltage of the diode bridge. The reference signal can vary as the system voltage is varied under certain circumstances. The protection circuit also provides for the calculation of a predetermined percentage of the reference signal voltage to create a tolerance band for testing the actual output voltage of the diode bridge rectifier. The percentage represents an acceptable limit of the ratio of a peak-to-peak ripple of the reference signal to the dc voltage of the reference signal. Using the reference signal and the percentage value to create a tolerance band, a comparator is used to test the actual output voltage of the diode bridge to determine if the output voltage is within the tolerance band. If the output voltage is detected to be outside the tolerance band, then the comparator generates a signal which activates trip circuitry associated with the system to interrupt the system. A subcircuit is also provided to inhibit a trip if the signal being tested is not within a minimum protection range.

16 Claims, 3 Drawing Sheets

BRUSHLESS EXCITER PROTECTION CIRCUIT

BACKGROUND OF THE INVENTION

This invention was funded in part by the United States Air Force under Agency Contract Number F33615-86-C-2680.

FIELD OF THE INVENTION

This invention relates to brushless excitation systems for large electrical generators. The ac exciter of the excitation system has an internal diode bridge associated with it which operates to rectify the generated ac current into dc excitation to supply the generator field winding. The invention provides a fast operating protection control circuit which monitors the output voltage of the diode bridge and initiates an interruption of the excitation system in the event of a failed diode. The circuit of the invention generates a time domain reference signal for comparison with the actual output signal of the diode bridge and rapidly provides a trip signal based upon a time domain comparison.

BACKGROUND INFORMATION

Large electrical generators require external excitation which is provided by the exciter. Conventional systems provide exciter output connected to the generator field through a series of slip rings or brushes. An alternative system is a brushless exciter which is joined directly to the generator field winding without the need for brushes or slip rings to carry power. Brushless excitation systems employ an internal diode bridge to rectify the ac current generated by the rotating armature.

In the event of a diode failure in the internal rectification system, rapid protection is required. This is particularly true of high power density brushless exciters as such systems have low thermal capacity. A failed diode can cause a phase-to-phase fault which can result in destructively high winding currents. Typically, the armature winding itself is not accessible for instrumentation required for testing or monitoring. As a result, it has been previously known to obtain information from the magnetic field windings by monitoring transformer action. This has been shown, for example, in U.S. Pat. Nos. 4,106,069 and 4,528,493.

In more recent machine designs, however, this type of monitoring is not effective due to the presence of strong damper systems which act to isolate the magnetic field of the winding. The damper systems further add excessive attenuation and delay to any signal which could be obtained from the field winding. These problems are even accentuated in cryogenic machines. Cryogenic machines exhibit high power density made possible by efficient cooling systems and by the use of cryogenic conductors. The cryogenic conductors allow high current densities with minimal ohmic loss due to the extremely low resistivity of the materials at cryogenic temperatures which may be on the order of twenty degrees Kelvin. One drawback of such machines is their low thermal capacity. Electrical faults in the generator, as can be induced by a failed diode, result in fault currents which may be 5 to 10 times rated current. Such high currents rapidly lead to higher conductor temperatures which can quickly become destructive to the entire system.

In order to reduce the probability of faults due to failed diodes, it has been known to provide a redundant series diode. However, there is still a possibility that even a second diode can fail. Moreover, in low loss machines such as those discussed herein, a second diode can present a substantial increase in loss because the excitation loss is essentially doubled due to the second diode. Thus, the need for additional protection still exists.

Another difficulty presented particularly with the cryogenic machines is that of delay in detection of a fault. As stated, conventional methods of protection involve monitoring the field winding for a change in the signal indicating a change in ac currents in the armature. However, if the ac signal induced in the field winding is strong, many cycles would have passed after the fault occurred because a time delay would occur while the magnetic field diffuses through the damper system and into the field winding. It would only be after the change occurred in the signal from the field winding that the fault would be detected. In the low thermal capacity machine, severe heating could have occurred in the armature winding during the delay.

There remains a need for a device which can accurately detect faults in a brushless excitation system without appreciable delay. There remains a further need for a protection mechanism which does not depend upon obtaining a measurement from the exciter field winding. There is also a need for a protection device which is operable and effective in the cryogenic class of machines.

SUMMARY OF THE INVENTION

These and other needs are satisfied by the present invention which provides a protection circuit which directly monitors diode bridge voltage to determine if such voltage is within an acceptable tolerance band. The output voltage from the diode bridge of the excitation system is used to generate a reference signal for comparison with an actual signal. The present invention includes means for generating a reference signal which tracks the diode bridge output signal. The reference signal which tracks the actual signal is extremely useful because the input signal is often intentionally varied by operator control. For example, in field tests, the field current is gradually increased, increasing the dc output voltage of the exciter. In the open circuit test, for example, the dc output voltage may vary from 50 to 320 volts. It is not desirable that such an increase trigger a trip event. However, protection against a fault is especially desirable in such circumstances due to the risk of rapid thermal runaway. The present invention includes features which provide protection in such testing conditions using a reference signal which tracks the actual operating conditions of the system so that reliable protection is provided for dc output voltage values which can range from 50 to 320 volts, for example.

Moreover, as is well understood by those skilled in the art, even a rectified dc signal contains variations and fluctuations in addition to the ripple. Some of the variations and fluctuations are attributable to normal high frequency noise. In the circuit of the present invention, this noise is simply removed by an appropriate low pass filter. In addition, a certain degree of lower frequency fluctuation can be present in an acceptable signal. Such lower frequency variations do not present a danger to the overall system and thus, they need not trigger a trip event. The present invention is designed to allow such normal variations in the signal. More specifically, the dc output voltage from the diode bridge is subjected to appropriate signal preparation for scaling, then a low pass filter is used to remove higher frequency variations as is discussed in further detail herein. With such undesired noise removed, the reference signal is thereby generated which tracks the output voltage of the diode bridge.

Within the variations of the signal, a measurement can be taken of the value of the voltage at a maximum peak of the variation minus the value of the voltage at the minimum of the peak. This is often referred to as the "peak-to-peak" ripple. In accordance with the present invention, this value is then compared to the overall magnitude of the dc signal to determine a percentage. It has been noted that for normal signals, the percentage of peak-to-peak ripple to dc magnitude will be about 12 to 16 percent. If the percentage is not within this range, an unacceptable variation in the signal has occurred which could present a potentially dangerous situation. The circuit of the present invention uses an inverting feedback amplifier with input resistors having selected values to continuously calculate this predetermined percentage value of the reference signal. This percentage is used to create a tolerance band against which the actual output voltage of the diode bridge is checked. A series of comparators, or preferably a window comparator, is used to determine whether the actual output voltage of the diode bridge remains within the tolerance band so created using the reference signal and the precalculated percentage value. In other words, it is determined whether the actual signal contains any voltage value which is greater or less than the calculated percentage value. If such is the case, then an interruption of the system is initiated by associated trip circuitry.

The circuit of the present invention also contains a second monitoring comparator which disables the trip circuitry when the dc value of the diode bridge is below the minimum of the protection range of the circuit of the present invention. This avoids a false trip upon start up or shut down of the system.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
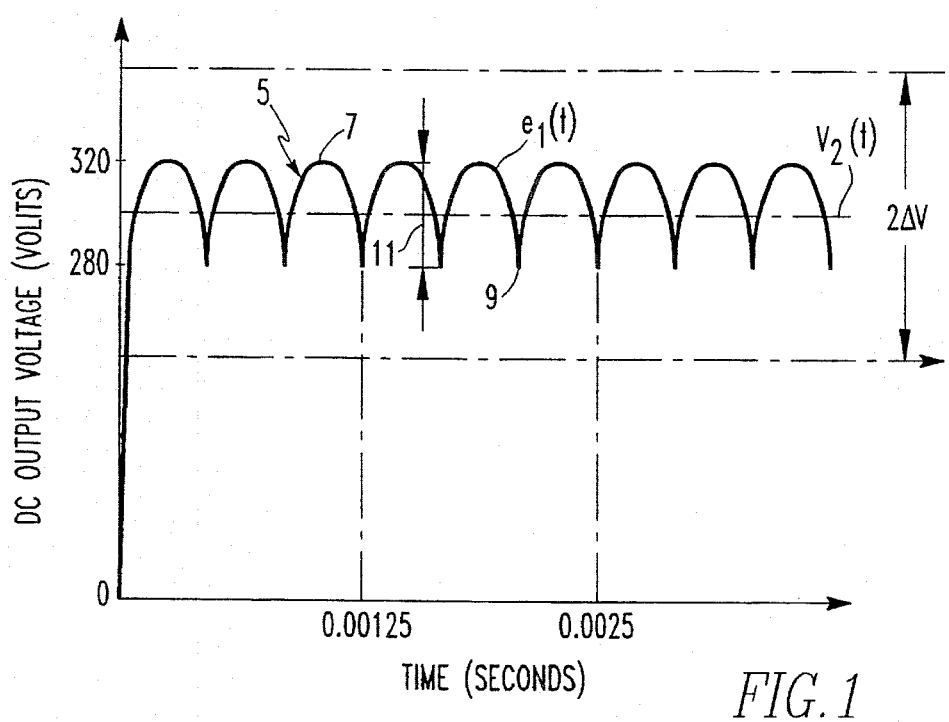
FIG. 1 is a graph showing the rectified output voltage of the diode bridge at full excitation plotted against time and showing its expected peak-to-peak ripple. This value is used in the circuit of the present invention to create the tolerance band.

The main components of a brushless excitation system are a pilot exciter, an ac exciter and a rectifier bridge. As noted herein, when the ac voltage signal is rectified by the diode bridge, the signal contains variations. An example of a dc output voltage signal rectified by a diode bridge is shown in FIG. 1. The dc signal is shown generally by reference character 5. The signal 5 has peaks such as maximum peak 7 and minimum peak 9. Maximum peak 7 may represent a voltage value of about 320 volts in the example of FIG. 1 and minimum peak 9 may represent a voltage value of about 280 volts. The incremental voltage value between peaks is shown schematically by reference character 11 in FIG. 1. This value is commonly referred to as the "peak-to-peak ripple." This term is well understood by those skilled in the art.

In a normally operating system, it has been found that the peak-to-peak ripple value is between about 12 to 16 percent of the average dc voltage value throughout the normal operating range. Typically, the average percentage is about 13 percent. In the example of FIG. 1 which represents maximum operating conditions, the peak-to-peak ripple is about 40 volts. The average dc voltage is about 300 volts. The percentage of the peak-to-peak ripple to the dc voltage is about 13.3 percent.

At minimum system operating conditions occurring after start up or before shut down or in other operating conditions which may arise between minimum and maximum conditions, such as during field testing, the same percentage values on the order of 12 to 16 percent also apply. For example, the waveform for minimum operating conditions would look similar to the waveform 5 shown in FIG. 1, however, the voltage value at the maximum peak could be in a typical situation about 48 volts and the peak-to-peak ripple value would be about 6 volts. In such a case, the percentage of the peak-to-peak ripple to the average dc voltage value is about 13.3. The percentage of the peak-to-peak ripple 11 (FIG. 1) to the dc voltage value in normal operating conditions is essentially the same for maximum operating conditions through minimum operating conditions.

Figure 2:
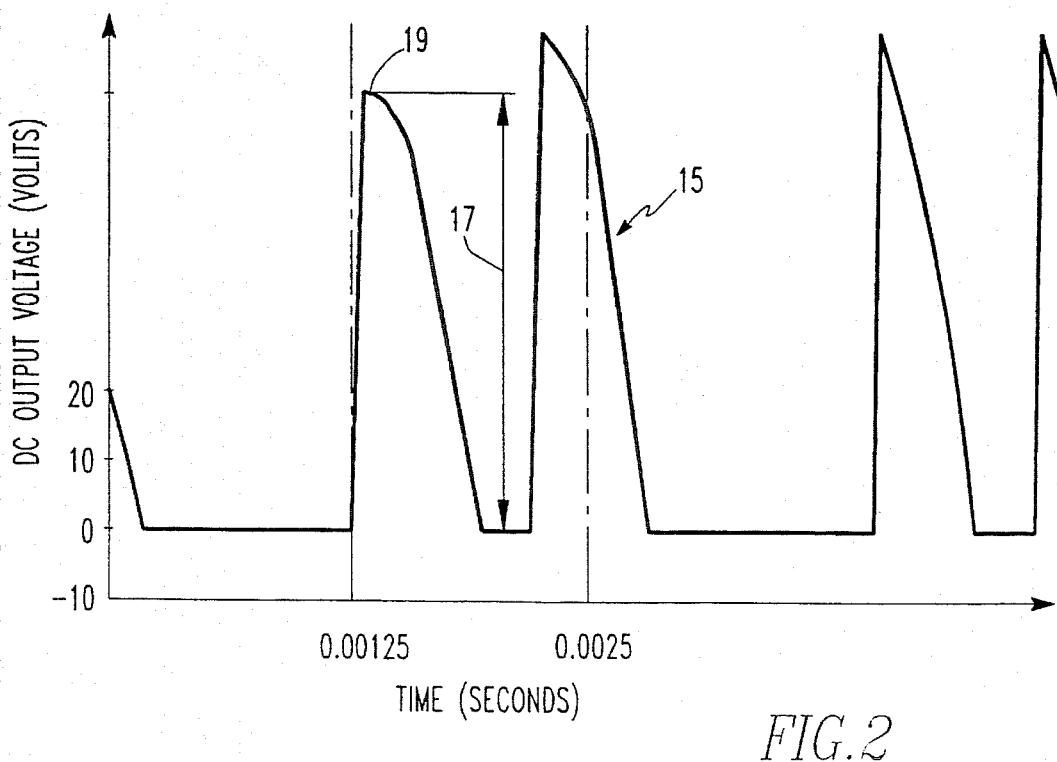
FIG. 2 is a graph showing the output voltage of the diode bridge when a fault has occurred and the peak-to-peak ripple is outside the tolerance band.

This is not the case, however, in a fault situation which could arise upon a shorted diode. The graph of FIG. 2 shows waveform 15 which is the "dc" output signal of the diode bridge in a fault situation. It is noted that waveform 15 looks considerably different than waveform 5 of FIG. 1. Waveform 15 of FIG. 2 contains elongated peaks. An exemplary peak-to-peak ripple is designated by reference character 17. It is noted that peak 19 represents a voltage value of about 35. Peak-to-peak ripple 17 is about 32. This is substantially greater than the initial dc value of about 20 volts and is outside of the acceptable tolerance range. This is also shown in that the percentage of the peak-to-peak ripple to the average dc value is on the order of 62 which is clearly out of the normal range of 12 to 16 discussed above.

The present invention utilizes the percentage value to determine whether the dc output voltage of the diode bridge is within a tolerance band for normal operating conditions. This will be readily understood with reference to FIG. 3 which is a schematic circuit and block diagram. More specifically, in FIG. 3, dashed box 25 represents the brushless exciter which is for purposes of the present disclosure a three phase, delta-connected, "inside-out" synchronous generator meaning that the field is stationary and the armature is rotating. It should be understood that the protection circuit of the present invention can also be adapted for use with other types of power generating machines.

Within dashed box 25 is regulator 27 which would be powered in a manner well understood by those skilled in the art. Exciter field 29 is stationary and exciter armature 31 is rotating. Power is thereby generated and supplied to a rotating three phase full wave diode bridge rectifier assembly 33. The resulting output voltage is the excitation voltage for the main cryogenic or high speed, high density synchronous generator shown in FIG. 3 by generator field 35. Main generator field 35 has associated therewith main generator armature generally designated by reference character 36.

As stated above, the types of generators with which the protection circuit of the present invention are preferably used exhibit high power density made possible by the use of more efficient cooling systems and cryogenic conductors. The protection circuit 38 of the present invention is connected to the diode rectifier assembly 33 by appropriate connection device 37. For purposes of the present disclosure, the output signal of the diode bridge 33 is being referred to as $e_s$. The signal $e_s$ is the input to an appropriately scaled voltage divider 43. The signal processing is discussed in greater detail herein with reference to FIG. 4, however, voltage divider 43 is a series of resistors chosen in magnitude such that the input voltage $e_s$ is scaled down by a factor of about 30 to 31. The input voltage to the circuit of the present invention from diode bridge 33 could be about 300 volts, for example, and the circuit voltage is chosen to be about 10 volts. As will be understood by those skilled in the art, there may be variations in these amounts depending upon the application in which the circuit of the present invention is used in which case the selected resistance values for voltage divider 43 can differ from those disclosed herein while remaining within the scope of the present invention.

As is common in signal processing, high frequency noise which may be present in the signal is removed by low pass filter 45 to generate signal $-e_1$. Signal $-e_1$ has the same waveform as incoming signal $e_s$ except that it is scaled down in magnitude, and the sign is changed.

A second low pass filter 47 thereafter removes the ripple (designated by reference character 11 in FIG. 1) from signal $-e_1$. The signal with the noise and high frequency ripple removed is a "dc" signal referred to herein as $V_2$. As noted herein, the dc component, $V_2$, can vary, but much more slowly than $-e_1$. It would also vary much more slowly than any voltage change in the signal due to a shorted diode. Thus, the second low pass filter 47 actually passes the normal, operational variation in the output signal from the diode bridge 33, but not high frequency noise, ripple or fault signal changes. As a result $V_2$ is a dc reference signal which tracks the average value of the original output signal $e_s$ from the diode bridge 33. In other words, $V_2$ is a scaled average output voltage after signal processing which varies with the actual signal as the actual signal is changed due to a change in normal operating conditions. For example, $V_2$ would track a maximum operating signal as discussed herein, or it would track a lower power operating condition involving start up or shut down. More importantly, $V_2$ will track the actual signal during a system test which may involve extremes in voltage and current conditions but which conditions could still be normal in the particular circumstances.

Once the reference signal, $V_2$, has been generated, the percentage of this value as discussed herein is obtained. The percentage of this value, $\Delta V$, can be obtained using a voltage divider comprised of a series of resistors having selected values and an inverting or noninverting feedback amplifier, depending upon the desired sign as discussed in further detail hereinafter. A nominal percentage, such as 13 or 14 percent, was chosen to create a tolerance band which is twice the normal signal. The amplifier circuit designated generally by reference character 49 is designed such that the input to the amplifier 49 is the reference signal $V_2$ and the output, $\Delta V$, is a voltage which is the chosen percentage of the its input signal, $V_2$. The output, $\Delta V$, is a continuously varying output which varies with $V_2$, the average value of the processed actual signal, $e_1$. One example of a subcircuit which obtains the percentage is disclosed hereinafter with reference to FIG. 4. An alternative to the percentage based upon the average value calculation could be based upon that of a peak detector. However, there may be instances in which simply testing the waveform alone for peaks may not be fully reliable.

A series of comparators or, preferably, a window comparator 51 (FIG. 3) is used to determine whether the processed actual signal $e_1$ is within a predetermined tolerance band. Window comparators will be understood by those skilled in the art. In addition, any other arrangements of comparators can be used while remaining within the scope of the present invention. Referring again to FIG. 3, window comparator 51 has as inputs: the output of inverting amplifier 46 which is the negative of the reference signal, $V_2$, the output, $\Delta V$, of circuit 49 which is half the tolerance band value, and the processed actual signal, $e_1$, which is the output of amplifier 48. Amplifier 48 is used simply to change the sign of the output of low pass filter 45 which was discussed herein. The window comparator 51 generates a tolerance band equal to 2 $\Delta V$ and then determines whether the signal, $e_1$, being tested is within the tolerance band or is outside the tolerance band. In particular, the center of the tolerance band is the negative of the reference signal, $V_2$. The width of the tolerance band is twice the input $\Delta V$ (the preselected percentage of reference $V_2$ which is the output of circuit 49.) The tolerance band, 2 $\Delta V$, thus varies as $V_2$ and, therefore, $\Delta V$ vary. The percentage remains constant. Circuitry within the window comparator 51 then generates an output to indicate whether the input signal being tested, $e_1$, is within the tolerance band. It should be understood that variations could be made in the tolerance band in a particular application such that, for example, one side of the signal is tested rather than the full width of 2 $\Delta V$. These variations could be made while remaining within the scope of the present invention.

The output of the window comparator 51 would be opposite in sign than would be desired in many applications. Thus, FIG. 3 also includes inverting amplifier 53 for effecting a change in sign of the output of comparator 51. As noted herein, the circuit implementation of the present invention contains several inverting amplifiers, namely, amplifiers 46, 48 and 53 and non-inverting amplifier 49. As will be understood by those skilled in the art, variations may be made to the circuit of the present invention which changes may require that the signal being processed be opposite in sign than as disclosed herein. Thus, the number and placement of amplifiers used within the circuit may differ from the circuit of FIG. 3 while still remaining within the scope of the present invention.

Figure 3:
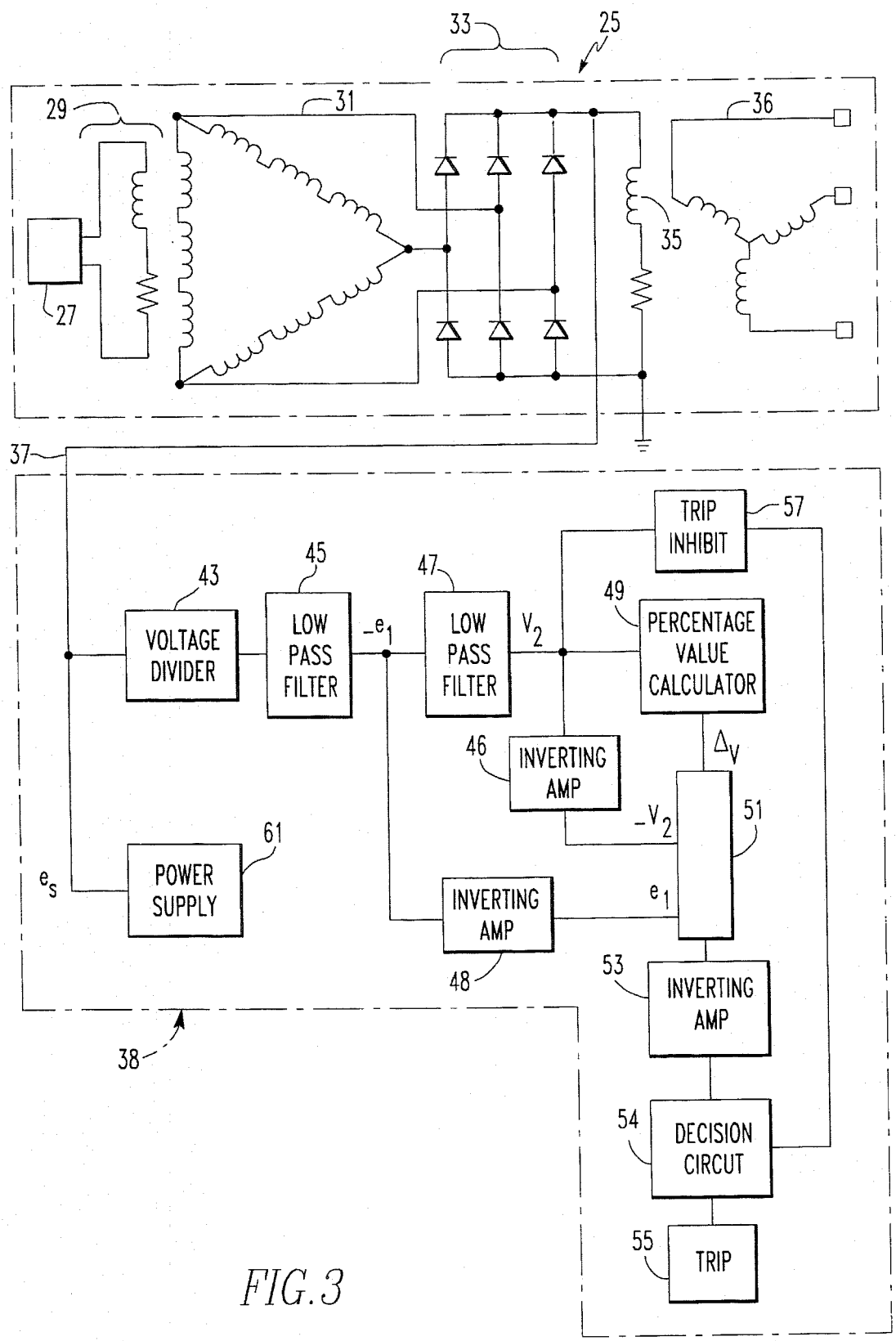
FIG. 3 is a combination schematic and block diagram of the protection circuit of the present invention.

As shown in FIG. 3, the output of amplifier 53 is used as one input to associated decision circuit 54. A trip inhibit signal can be generated which inhibits trip device 55 as discussed in further detail herein. Trip device 55 is activated when the window comparator 51 detects a signal $e_1$ which is outside the tolerance band.

Trip device 55 is any device appropriate to interrupt the particular generator with which the protection circuit of the present invention is being used as will be well understood by those skilled in the art.

Power supply 61 to the system is shown in FIG. 3 as receiving its input from the source voltage, $e_s$, from diode bridge rectifier 33. Power supply 61 is preferably a peak detector followed by a chopper (not shown in FIG. 3). The embodiment shown in FIG. 3 is thereby a self-powered system. Such a system simplifies connections and eliminates grounding problems. There may be circumstances in which another type of power supply such as, for example, a battery is preferable. The protection assembly of the present invention is readily adaptable to operate with such other types of power supply devices.

The protection circuit of the present invention also includes an additional protection mechanism for a situation in which the source voltage is below the minimum protection range for the remainder of the circuit. More specifically, a source voltage may become quite low during start up and shut down conditions. At such low voltages, the percentage as calculated by the circuitry disclosed herein could cause a trip when actually a trip is not desired or capable of being implemented. To avoid such false trips and the like, the circuit is provided with trip inhibit device 57 (FIG. 3) which preferably is composed of a hysteresis comparator designed such that its output is high when the input voltage goes from zero to a particular, higher voltage. The high output inhibits the trip device 55 from causing a trip of the system. When the input voltage crosses through a selected threshold, the hysteresis circuit drops its output to low. The low output is used to allow a trip to occur if the overall protection circuit including window comparator 51 determines that the input signal is outside the tolerance band. Hysteresis comparator 57 also generates a high signal which inhibits the trip device 55 as the input signal, $V_2$ comes back down into the inhibit range, but the switching back to high occurs at a lower voltage than the initial switch threshold. This is to avoid undesired wavering between an on and off condition. It should be understood by those skilled in the art that the circuit can be readily implemented such that the inhibit is a low signal and will enable a high signal if desired.

In order to ensure proper operation of all circuitry, power supply 61 must be fully functional for source voltages below the minimum protection range set by the trip inhibit device 57. Preferably, the supply is chosen to be operational at at least about 35 volts for the embodiment disclosed herein. High voltage protection can also be easily added to the system of the present invention. The present embodiment includes a 10 amp fuse; the power supply 61 is made to draw less than 10 amps even during start up.

Figure 4:
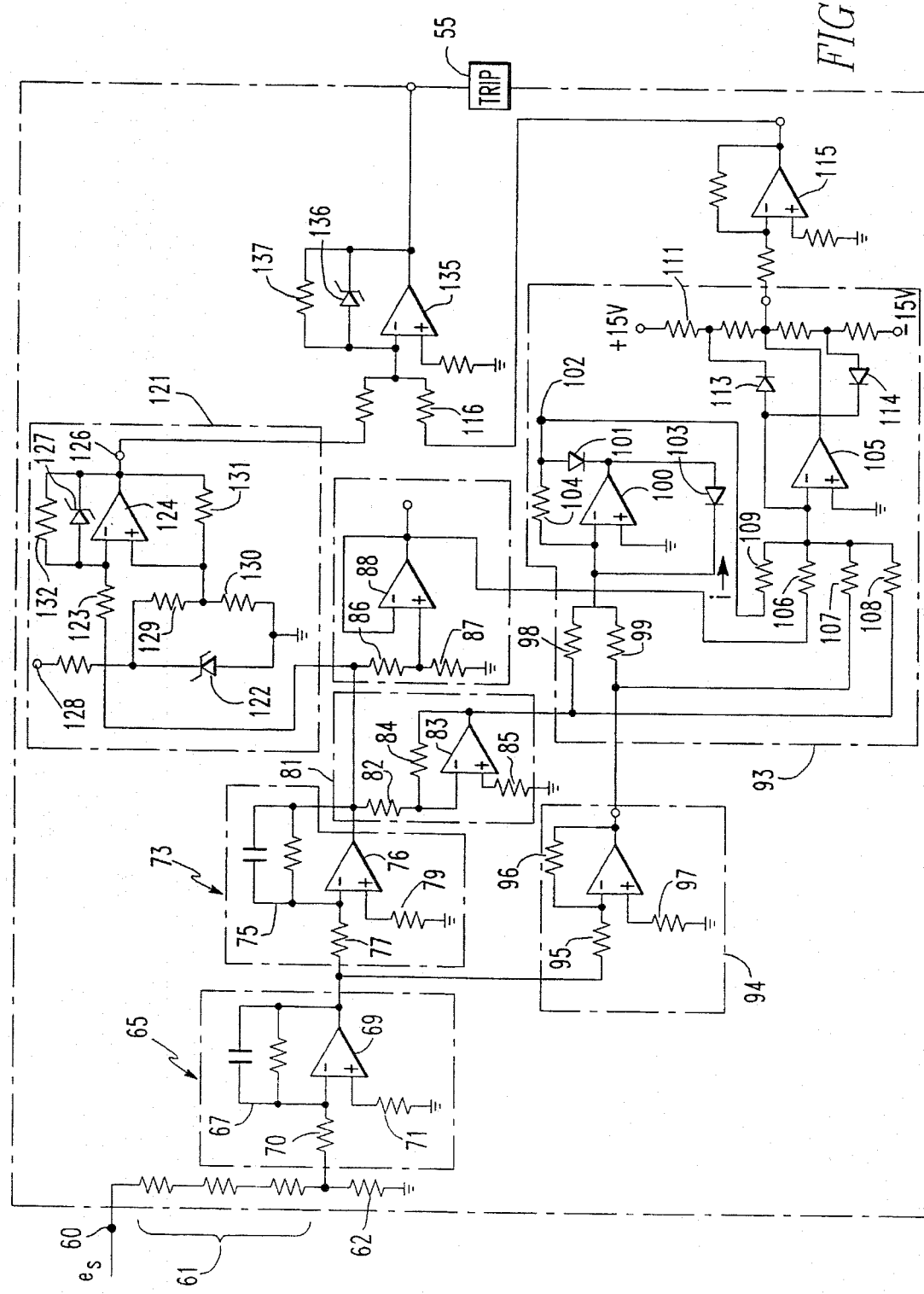
FIG. 4 is a circuit diagram of one embodiment of the present invention.

FIG. 4 shows one embodiment of the protection circuit of the present invention. FIG. 4 includes specific values for the circuit components in order to disclose an exemplary circuit for practicing the disclosed invention, however, it should be understood that various modifications could be made to the circuit while remaining within the scope of the present invention. The present embodiment refers to a 400 Hertz unit having a desired protection range of between about 50 and 320 volts dc, open circuit. It is assumed that voltage changes are being made relatively slowly, perhaps by hand adjustments, and therefore, the variations are slow compared to the ripple removed by the second low pass filter as discussed hereinafter.

Referring now to FIG. 4, input signal, $e_s$, which is the output of the diode bridge rectifier 33 (FIG. 3), is shown schematically at point 60 in the circuit diagram. The signal $e_s$ passes through a voltage divider generally designated by reference character 61 in FIG. 4. Voltage divider 61 is composed of three 90.9 Kilo-ohm (K) resistors in series, a 9.09K resistor is connected to ground. Voltage divider 61 scales the input voltage $e_s$ down by a factor of about 31. As will be understood by those skilled in the art, other applications may involve different input voltage values and in those cases the value of the resistors of voltage divider 61 can simply be adjusted accordingly.

The signal $e_s$ is further processed by removing high frequency noise therefrom. More specifically, the components within dashed box 65 comprise the first low pass filter which removes the high frequency noise from the signal. A resistor-capacitor feedback pair 67 is electrically connected in the traditional manner to operational amplifier 69. The capacitor of pair 67 preferably has a value of 680 picafarads (pf). The resistor is chosen to be a 12.1K resistor. The input signal voltage, $e_s$, is received into the low pass filter 65 by way of a 2.74K input resistor 70. The signal, $e_s$, has been divided as discussed herein and has an equivalent source resistance in series with the 2.74K resistor 70. A 6.2K resistor 71 is connected between the positive terminal and ground. This arrangement not only accomplishes the removal of the high frequency noise, but the amplifier 69 connected as described herein has a gain of about 5 percent. This is desirable because the initial scaling by the voltage divider 61 is actually somewhat greater than desired. Thus, the gain to the signal provided by the amplifier 69 subcircuit results in an output signal $e_s$ which is of the desired magnitude for the present embodiment of the circuit. The actual output of the low pass filter 65 is $-e_1$ as the low pass filter includes an inverting amplifier as will be well understood by those skilled in the art. The sign of the signal can be changed as desired within the circuit as discussed herein. This signal, $e_1$, is then connected as an input to window comparator 51 (FIG. 3) after having the sign of the signal changed, and also as an input to the second low pass filter shown within dashed box 73 in FIG. 4.

Dashed box 73 in FIG. 4 represents the second low pass filter. As discussed herein, this filter 73 is used to remove the high frequency ripple from the signal, $e_1$, in order to generate the reference signal, $V_2$. A resistor-capacitor feedback pair 75 is connected to amplifier 76. The resistor and capacitor preferably have, respectively, the values 8.25K and 0.1 micro farads. The input signal $-e_1$ is received into the negative terminal of amplifier 76 by way of an 8.25K input resistor 77. The positive terminal of amplifier 76 is connected to ground by resistor 79 which preferably has a value of 3.9K. The output of low pass filter 73 is reference signal $V_2$.

The output of the low pass filter 73 which is reference signal $V_2$ is then an input to three different subcircuits within the overall protection circuit of the present invention. First, the reference signal $V_2$ is one input to the window comparator 51 which is described further hereinafter. It is preferable, however, that this input to window comparator 51 be negative in sign. Thus, the circuit includes a unity gain inverting amplifier 81 connected to receive the output ($V_2$) of the second low pass filter 73. Preferably a 10K input resistor 82 is connected to amplifier 83 which has a 10K feedback resistor 84 and a 5.1K resistor 85 to ground.

The reference signal $V_2$ is also an input to the circuitry which performs the initial calculation of the tolerance band against which the actual signal is tested. As discussed herein, a percentage of the average dc value of the reference signal, $V_2$ is to be calculated. In the embodiment of FIG. 4, $V_2$ enters a voltage divider composed of resistors 86 and 87. Preferably, resistor 86 is a 39.2K resistor and resistor 87 has a value of 6.81K. The resulting signal is effectively a percentage of the average dc value of $V_2$. Alternatively, resistors 86 and 87 can be replaced with a variable resistor which would allow changes to be made to the preset percentage if desired in a particular application. Buffer amplifier 88 receives this signal and its output is referred to herein as $\Delta V$. $\Delta V$ is a second input to the window comparator which is shown in dashed box 93 in FIG. 4.

As noted herein, window comparator 93 has as two of its inputs, signals $e_1$ and $-V_2$. Signal $e_1$, which is the actual signal processed in the manner described herein, is received into the comparator 93 through an inverting amplifier circuit 94 having a 10.0K input resistor 95, a 10.0K feedback resistor 96 and a 10.0K resistor 97 to ground. The comparator 93 receives signal $e_1$, through a 20.0K resistor 98. Similarly, the reference signal $-V_2$ is received into the comparator 93 through a second 20.0K resistor 99. The resulting signals are then summed and connected to the negative terminal of operational amplifier 100. Operational amplifier 99 has two associated diodes, 101 and 103 which are connected in the manner shown in FIG. 4. A 10.0K feedback resistor 104 is connected across amplifier 99. The function of diodes, 101 and 103, is that when $e_1+(-V_2)<0$, diode 103 is conducting and diode 101 is reverse-biased. Therefore, the output of amplifier 100 does not contribute to the output of second amplifier 105 as the voltage at junction 102 is zero. Operational amplifier 105 has all three signals, $\Delta V$, $e_1$, and $-V_2$ as inputs through 20.0K resistors, 106, 107, and 108, respectively. Those resistors are in turn connected with a 5.11K resistor 109 through which the voltage at junction 102 passes. The sum of these signals is connected to the negative terminal of operational amplifier 105.

The limiter circuit of amplifier 105 changes sign when the current i changes sign. Thus:

$$(e_1/R)+(V_2/R)+(\Delta V/R)=i=0 \qquad \text{Eq. 1}$$

The output resistors generally designated by reference character 111 are connected to 15 volt supplies with diodes 113 and 114 as shown. A trip signal is generated if the signal $e_1$ is not within the tolerance band. The trip signal, sufficient to enable the associated trip device 55, is generated.

In the present embodiment it is desirable that the output signal of the comparator be changed in sign. Thus, an inverting amplifier 115 is connected in a manner similar to that discussed with reference to inverting amplifier 94 to receive this output as shown in FIG. 4.

The signal at the output of amplifier 115, which will be referred to herein as $-e_0$, is connected by way of 20.0K resistor 116 to the negative input terminal of another operational amplifier 135. Also connected to this amplifier is the output signal of the hysteresis comparator generally designated by reference character 121. Hysteresis comparator 121 is designed to inhibit activation of the trip device 55 in the event that the actual signal is below a minimum value for the remainder of the protection circuit to operate correctly. For example, the power supply may be low or the dc voltage from the diode bridge 33 may be low during start up in which case a false trip could occur because $e_1$ may be outside of the tolerance band even though a trip is not desired. Thus, the hysteresis comparator 121 generates a high signal until the input voltage reaches an acceptable value at which point the comparator 121 switches to a low output signal. This is accomplished using zener diode 122 as connected in the manner shown to a 15 volt rail with a 1.0K resistor 128, and resistors 129 and 130 being 22.1K and 11.0K resistors, respectively, to generate a reference voltage. The input voltage $V_2$ is then connected through a 7.5K resistor 123 to the negative terminal of amplifier 124. The 243K resistor 131 holds the positive terminal of operational amplifier 124 to the reference voltage. A 280K feedback resistor 132 is used with zener diode 127 to provide a high output for low values of $V_2$. The output at node 126 will be about 5 to 7 volts for low values of $V_2$ and will switch to low for high values of $V_2$. In the embodiment of FIG. 4, the inhibit condition of the output 126 switches off at about 50 volts at which point a trip would then be possible if the appropriate signal was generated by window comparator 93.

The additional circuitry including amplifier 135, zener diode 136 and 100K feedback resistor 137, are used to process the output of the window comparator 93 and the output of the hysteresis comparator 121 such that the output of amplifier 135 activates trip device 55 in the event that the window comparator 93 detects an input signal outside the tolerance band and the hysteresis comparator 121 is not in the inhibit condition. More specifically, the two outputs are summed and this sum is the input to the negative terminal of amplifier 135. The amplifier inverts the sign of the signal and the 100K resistor and zener diode pair result in a gain to the signal of a factor of 5. The possible conditions for the output of the window comparator 93 are $-5$ volts (Trip) or $+5$ volts (No Trip). The possible conditions from hysteresis comparator are $+7$ volts (Inhibit) and 1.5 volts (Enable trip). Three of the resulting voltages at the output of amplifier 135 for three of the four combinations of these conditions are negative in sign and will result in a signal to the trip device 55 of about 0.7 volts which would not activate a trip. The one combination of the signals which is positive in sign occurs when the window comparator 93 is at $-5$ volts (Trip) and hysteresis comparator 121 is at $+1.5$ volts (Enable Trip), which would have a summed magnitude into amplifier 135 of $-3.5$ volts. With the sign inverted by the amplifier and the gain of a factor of about 5, this results in an output signal of about $+20$ volts which is clamped by zener diode 136 to 5 volts. Such a signal would then activate trip device 55 to interrupt the overall exciter system. The amounts described are for purposes of illustration and to provide a full disclosure. The actual values may vary slightly between circuits and could also be intentionally modified based on the particular application in which the circuit of the present invention is to be used.

It is noted that an analog circuit has been described herein for the purposes of the present disclosure, however, the present invention is readily adaptable to a digital or hybrid implementation.

It should be understood that the invention provides a safe and reliable protection circuit for a brushless excitation system which has no appreciable delay. Furthermore, the invention is particularly well-suited to use with cryogenic machines in which access to measurements from the field winding is difficult or impossible. The circuit of the present invention is not dependent upon measurements from the field winding and instead directly monitors the output of the diode bridge.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In a brushless excitation system containing a multiphase ac exciter and a diode bridge rectifier assembly having an output voltage, an exciter protection assembly comprising:

means generating a reference signal which tracks a dc value of said output voltage of said diode bridge rectifier assembly, said means generating said reference signal including voltage divider means for scaling down said output voltage from said diode bridge by a preselected factor and said means generating said reference signal also including at least one low pass filter means for removing a high frequency ripple from said output voltage; and means generating from said reference signal a tolerance band associated with said reference signal and including comparison means generating an output signal when said output voltage of said diode bridge rectifier assembly is outside said tolerance band, said means generating said tolerance band including means for obtaining a predetermined percentage of an average dc value of said reference signal and said tolerance band being associated with said percentage.

2. The exciter protecting assembly of claim 1 wherein said means generating said tolerance band includes a voltage divider for obtaining said percentage and a buffer amplifier having as an output a signal which is said percentage of said average dc value of said reference signal.

3. The exciter protection assembly of claim 1 wherein said means generating said tolerance band generates a tolerance band having a width of about twice said percentage of said reference signal.

4. The exciter protection assembly of claim 1 wherein said means generating said tolerance band generates a tolerance band having as a midpoint an instantaneous value of said reference signal.

5. The exciter protection assembly of claim 1 wherein said comparison means of said means generating said tolerance band includes window comparator means.

6. The exciter protection assembly of claim 1 wherein said window comparator means has as inputs said percentage of said reference signal, the negative of said reference signal and said output voltage of said diode bridge with high frequency noise removed but still containing said high frequency ripple.

7. The exciter protection assembly of claim 1 further comprising trip means activated by said output signal of said comparison means if said output voltage of said diode bridge is outside said tolerance band.

8. The exciter protection assembly of claim 7 further comprising trip inhibit means including hysteresis comparator means having as an input said reference signal and having means for determining whether said reference signal is below a predetermined threshold, and also having means generating an output signal to inhibit said trip means if said reference signal is below said threshold.

9. In a brushless excitation system containing a multiphase ac exciter and a diode bridge rectifier assembly having a dc output voltage, an exciter protection assembly comprising:

reference signal generating means connected to receive said dc output voltage of said diode bridge rectifier assembly including low pass filter means operable to remove any high frequency ripple from said output voltage to generate a reference signal representing normal operation of said diode bridge rectifier assembly including acceptable changes due to control changes in the brushless excitation system;

percentage value signal generating means connected to receive said reference signal as an input, said percentage value signal generating means for continuously producing a signal which is a predetermined percentage of said reference signal which percentage represents a ratio of a peak-to-peak ripple of said reference signal to the voltage of said reference signal;

primary comparator means having as inputs: said dc output voltage of said diode bridge rectifier assembly, said reference signal and said percentage value signal, said comparator means generating a tolerance band within which to continuously test said dc output voltage of said diode bridge, and said comparator means also having means for generating a predetermined output signal in the event that said dc output voltage is detected by said comparator means to be outside said tolerance band;

trip means associated with said brushless excitation system, said trip means being activated by said output signal of said primary comparator means such that said excitation system is interrupted when said dc output voltage is outside said tolerance band; and power supply means supplying power to said exciter protection assembly.

10. The exciter protection assembly of claim 9 further comprising:

hysteresis comparator means connected to receive said dc output voltage of said diode bridge, said hysteresis comparator means having means for detecting whether said dc output voltage is below a minimum threshold, said hysteresis comparator means being connected to said trip means such that said trip means is inhibited when said dc output voltage is below said minimum.

11. The exciter protection assembly of claim 9 wherein said primary comparator means is a window comparator means having as a center of said tolerance band, the negative of the reference signal voltage.

12. The exciter protection assembly of claim 9 wherein said primary comparator means is a window comparator means having a width of said tolerance band being approximately equal to twice the percentage value signal.

13. The exciter protection assembly of claim 9 further comprising:

signal preparation means connected to receive said dc output voltage directly from said diode bridge rectifier, said signal preparation means including voltage divider means and also filter means for removing undesired high frequency noise transients from said dc output voltage.

14. The exciter protection assembly of claim 9 wherein said power supply means is driven by the dc output voltage of said diode bridge rectifier.

15. The exciter protection assembly of claim 9 further comprising:

inverting amplifier means connected to receive the output of said reference signal generating means.

16. The exciter protection assembly of claim 13 further comprising:

inverting amplifier means connected to receive an output of said signal preparation means.

* * * * *